Jan. 17, 1956

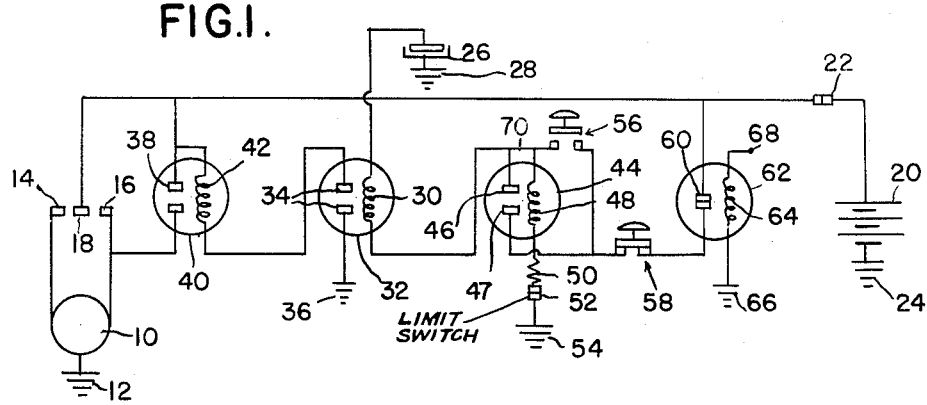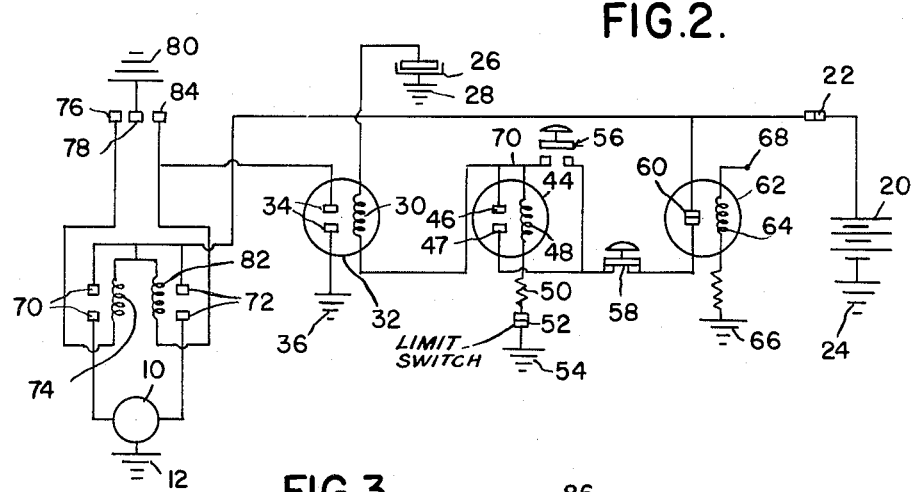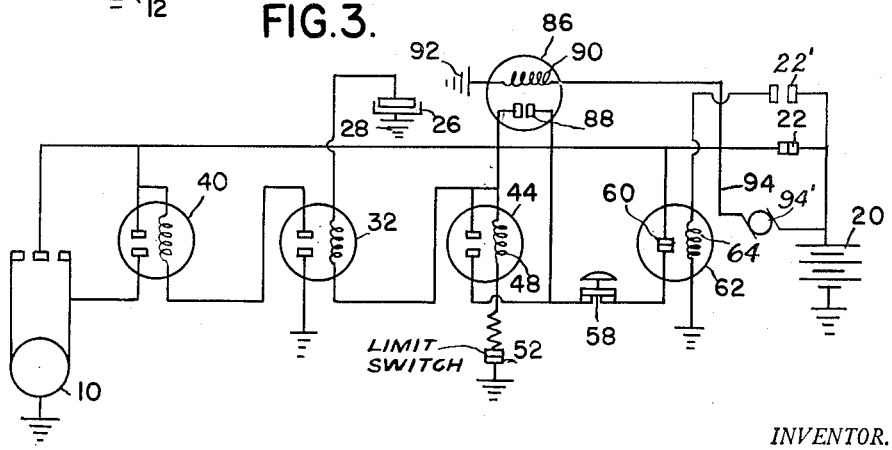

S. B McLEOD 2,731,588

AUTOMOBILE TOP AND WINDOW ACTUATING CIRCUIT
RESPONSIVE TO MOISTURE CONDITIONS

Filed July 7, 1952

INVENTOR.
STEWART B. McLEOD
BY Whittemore
Hulbert & Belknap
ATTORNEYS

United States Patent Office 2,731,588
Patented Jan. 17, 1956

2,731,588

AUTOMOBILE TOP AND WINDOW ACTUATING CIRCUIT RESPONSIVE TO MOISTURE CONDITIONS

Stewart B. McLeod, Dearborn, Mich., assignor to Detroit Harvester Company, Detroit, Mich., a corporation of Michigan Application July 7, 1952, Serial No. 297,583

8 Claims. (Cl. 318—483)

The present invention relates to a circuit for controlling opening and closing movements of closures, such as windows, awnings, convertible tops of automotive vehicles, automobile windows, and the like; and particularly to such a circuit including means responsive to precipitation for effecting automatic movement of the closure when precipitation commences.

It is an object of the present invention to provide control means for a power device for opening and closing windows and/or the convertible top of a vehicle including means responsive to precipitation for effecting automatic closure of the windows and/or top when the vehicle is unattended, characterized by the simplicity of the control means, protective features thereof which effect permanent breaking of the circuit in the event the windows and/or top fail to close automatically, and by an arrangement preventing accidental setting of the control system for automatic operation.

More specifically, it is an object of the present invention to provide in a system of the character described a circuit including a sensitive relay having a winding in series with a rain cell, a second relay including a winding having a holding circuit and adapted to be energized by momentary closure of a control switch, a limit switch adapted to be opened automatically upon closure of the vehicle top, and a thermally responsive switch adapted to de-energize the second relay in the event of mechanical failure preventing operation of the limit switch.

Other objects and features of the invention will become apparent as the description proceeds, especially when taken in conjunction with the accompanying drawings, wherein:

Figure 1 is a simplified wiring diagram showing the control circuit for effecting operation of the top actuating motor from the storage battery of the vehicle.

Figure 2 is a simplified wiring diagram showing the application of the system to a different type of motor control means.

Figure 3 is a simplified wiring diagram showing an adaptation of the circuit which provides automatic setting of the control circuit upon stopping the vehicle engine.

Figure 4:
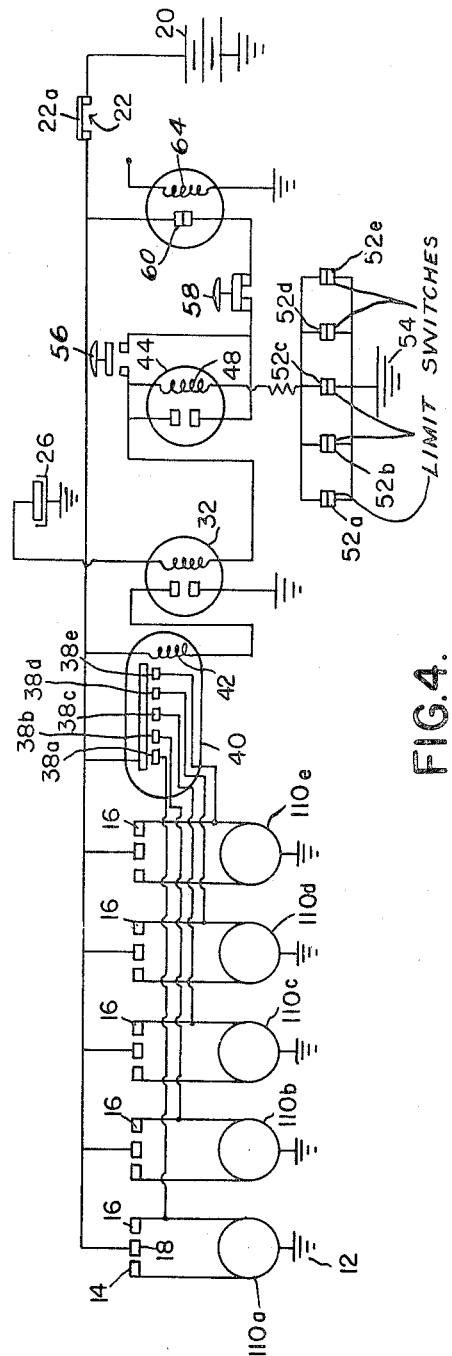
Figure 4 is a simplified wiring diagram showing a circuit for controlling a top and windows of a vehicle.

In Figure 1 there is shown a motor 10 grounded as indicated at 12, and connected to a top opening contact 14 and a top closing contact 16. Contacts 14 and 16 cooperate selectively with a movable contact 18 which is connected to the storage battery 20 of the vehicle through a normally closed thermally responsive switch 22. The battery 20 is grounded as indicated at 24 and engagement between the contact 18 and either of the switches 14 or 16 will result in energization of the motor to drive the motor respectively in a direction to open or close the convertible top of the vehicle.

The control circuit includes a rain cell 26 which is grounded as indicated at 28, and is connected in series with the winding 30 of a sensitive relay 32 having normally open contacts 34, one of the contacts being grounded as indicated at 36.

The rain cell may be of any desired type that when dry is effectively a non-conductor of electricity. However, when moistened, as for example by as little as a single drop of rain, the rain cell drops from a very high value to possibly 500 or 1000 ohms in two or three seconds. A rain cell of this type connected to the conventional storage battery of a vehicle is adapted to conduct sufficient electricity to operate a sensitive relay such as indicated at 32.

In parallel with the contacts 16, 18 which control energization of the motor 10 in a direction to close the top of the vehicle, are the normally open contacts 38 of a relay 40 having a winding 42 in series with the normally open grounded contacts 34. Thus, when the sensitive relay 32 is energized by the rain cell 26, the relay 40 is operated to close the contacts 38 and a circuit is established through the contacts 38 in parallel with the contacts 16, 18 to the motor 10, thereby initiating operation of the motor in a direction to close the convertible top of the vehicle.

The circuit is provided with means which permit the automatic operation of the system or which prevent such operation. This means includes a relay 44 having normally open contacts 46 and 47 in series with the winding 30 of the sensitive relay 32 and having a winding 48 connected through a high resistance 50 and a limit switch 52 to ground as indicated at 54. In practice, winding 48 will preferably be of high resistance, obviating the necessity of a separate resistance 50, but it is illustrated as separate to make the diagram of the circuit self-explanatory. The winding 48 of the relay 44 is connected to the battery 20. In the circuit connecting the winding 48 with the battery 20 is a switch 56 preferably located in the passenger compartment in a position for convenient actuation. Included in series with the switch 56 is a manual lock-out switch 58 which is preferably located in a concealed position or in a position affording relatively difficult access. The purpose of so locating the switch 58 is to disable the entire control circuit and to prevent setting of the control circuit by an atttendant who might inadvertently briefly close the contacts of the switch 56 without realizing that such momentary closure upsets the control circuit from subsequent automatic operation.

Also in series with the switches 56 and 58 are the normally closed contacts 60 of a relay 62 having a winding 64 grounded as indicated at 66 and connected to a terminal 68 connected to the primary wire of the ignition coil. The purpose of the relay 62 is to retain contacts 60 open whenever the motor of the vehicle is running and to permit closure of such contacts only when the motor is stopped.

Contact 46 is connected as indicated at 70 to the end of the winding 48 opposite to its ground connection to establish a holding circuit maintaining contacts 46 and 47 closed.

The limit switch 52 is located in a position such that its contacts are mechanically opened when the top reaches its fully closed position. The normally closed thermally operated switch 22 is of the type which is adapted to open as a result of increase in temperature resulting from heavier than normal current conditions. Instead of a thermally actuated switch 22, it will be appreciated that any type of switch having normally closed contacts opening instantaneously or after a predetermined time delay in response to overload conditions, can be employed.

The foregoing circuit provides means whereby the top may be automatically moved between open and closed positions. This is under the control of the operator by proper manipulation of switch means including the contacts 14, 16 and 18. However, with the top in open position the control circuit may be set up to provide automatic closure of the top in response to the presence of moisture on the rain cell 26. It is of course desired to prevent power operation of the top to closed position when the vehicle is in motion and this is insured by the provision of the relay 62 which disables the automatic control circuit whenever the ignition key of the vehicle is on. However, when the vehicle is parked with the top down the control circuit may be selectively rendered operable or inoperable by the lock-out switch 58 which is located in a concealed or inaccessible position. The lock-out switch 58 is a two-position switch and when it is desired to obtain automatic closure of the top the lock-out switch 58 is moved to the closed position illustrated in Figure 1. At this time a circuit from the battery is established through the overload switch 22, the normally closed contact 60, and the lock-out switch 58. In order to set the circuit for automatic operation the operator momentarily closes normally open switch 56, thus establishing a circuit through the winding 48, the resistance 50, limit switch 52 to ground as indicated at 54. Momentary actuation of the relay 44 as thus described closes the contacts 46 and 47 and a holding circuit is established from lock-out switch 58 through the closed contacts 46 and 47, the connection 70, through the winding 48 to ground at 54. This holding circuit includes the high resistance 50 so as to prevent an undesirable drain on the storage battery. By proper selection of the resistance a negligible current will be drawn from the battery so that it is entirely practical to leave the vehicle with the automatic top closure circuit set for automatic operation for many days.

With the circuit as thus far described, battery voltage is applied through contact 60, switch 58, contacts 46, 47 to the sensitive relay 30 which is in series with the rain cell 26. If now a drop of moisture falls upon the rain cell 26 a small current passes through the sensitive winding 30 and the rain cell 26 to ground at 28, thus closing the contacts 34 of the sensitive relay 32. Closure of contacts 34 immediately establishes a circuit through the winding 42 of the relay 40 to ground at 36, thereby closing normally open contacts 38 and initiating operation of the motor 10 in the proper direction to produce closure of the top.

Under the aforesaid conditions the top starts to close and continues its closing movement until movement of the top to closed position eventually opens limit switch 52. Opening of limit switch 52 interrupts the flow of current through the winding 48 and permits normally open contacts 46 and 47 to re-open, thereby interrupting the flow of current from the battery to the rain cell. This in turn de-energizes relay 32 which in turn de-energizes relay 40, thereby interrupting operation of the motor 10.

If for any reason the top is prevented from moving to closed position, as for example might occur if a cover for the top were inadvertently left in position to prevent movement of the top to closed position, the overload of the motor 10 will open the normally closed contacts of the overload switch 22. Opening of these contacts will immediately de-energize the relay 44 and subsequent closure of the contacts of the switch 22 (as will occur if a simple normally closed thermally open switch is employed) will not re-energize relay 44.

There is thus provided a simple circuit under full control of the operator by means of which the automatic mechanism for closing the top may be rendered operative or inoperative by closure or opening of the lock-out switch 58. In addition, automatic means are provided in the circuit which prevent automatic operation whenever the ignition circuit of the vehicle is established. Moreover, the circuit includes the switch 56 which requires momentary closure by the operator to set the circuit for automatic operation. Means are provided interrupting operation of the motor 10 when the top has moved to fully closed position. In addition, in the event of mechanical blocking of movement of the top to closed position, the control circuit is de-energized in response to overload in the circuit and will thereafter remain in inoperative condition until manually reset.

Referring now to Figure 2 there is illustrated a similar circuit which includes many of the same elements as the circuit disclosed in Figure 1. Accordingly in Figure 2 corresponding parts are given like numbers and the description of the circuit in Figure 2 will be limited to those circuit elements differing from Figure 1.

In the circuit of Figure 2 the motor 10 is connected at one side to normally open contacts 70 adapted when closed to establish a circuit to operate the motor in a direction to effect opening movement of the top. The opposite side of the motor 10 is connected through normally open contacts 72 to a circuit adapted to operate the motor in a direction to move the top from open to closed position. The contacts 70 are adapted to be closed by a winding 74 interposed between the battery 20 and a contact 76 and a movable contact 78 grounded as indicated at 80. In like manner, normally open contacts 72 are adapted to be closed by a winding 82 interposed between the battery 20 and a contact 84 and the movable contact 78. Thus, when the contact 78 is manually moved into engagement with the contact 76, winding 74 is energized, contacts 70 are closed, and the motor operates in a direction to move the top from closed to open position. In like manner, when the contact 78 is moved into engagement with the contact 84, the relay 82 is energized and closes contact 72, thereby establishing a circuit through the motor adapted to operate the motor in a direction to move the top from open to closed position.

The sensitive relay 32 is connected so that its normally open contacts 34 when closed establish a circuit from the battery 20 through overload switch 22, the winding 82, to ground, thus by-passing the manual contacts 78 and 84. Thus, energization of the sensitive relay 32 by the presence of moisture on the rain cell 26 energizes the motor 10 in a direction to move the top from open to closed position. Operation of the motor thus initiated by energization of the sensitive relay 32 continues until the circuit is interrupted by opening of the limit switch 52, or alternatively, by opening of the overload switch 22. Referring now to Figure 3 there is illustrated a modification of the control circuit described above. In this case the circuit is identical with that shown in Figure 1 except that instead of employing a manually operated switch 56, means are provided which automatically sets the control circuit for automatic operation when the ignition of the vehicle is turned off. For this purpose, a relay 86 is provided having normally open contacts 88 connected in series between the manual lock-out switch 58 and the winding 48 of the relay 44. The relay 86 includes a winding 90 grounded as indicated at 92, connected to the terminal 94 which is connected to the generator armature terminal either at the generator or voltage control regulator. In this case the winding 64 of the relay 62 has different characteristics from the winding 90 of the relay 86, thus in a practical application of the present invention the winding 64 may be designed to operate on six volts and to release when the voltage applied to the winding drops to approximately four volts. On the other hand, the winding 90 of the relay 86 is designed to operate on four volts or less, and to release only when the voltage drops to one volt or less. Inasmuch as the terminal 94 is connected to the generator armature 94′, when the ignition switch 22′ is turned off the output of the generator drops gradually rather than being instantaneously interrupted. Accordingly, normally closed contact 60 of the relay 62 will close before opening of the normally open contact 88 of the relay 86. This of course has the same effect as momentary closure of the contacts 88 which correspond to momentary closure of the switch 56 as previously described. Accordingly, with the manual lock-out switch in closed position, the control circuit for the power closure of the top is set in operative condition whenever the motor has been operating and the ignition switch opened.

Referring now to Figure 4, there is shown a modified circuit adapted to control simultaneous closure of the top and windows of an automotive vehicle, or the circuit of course could be employed to control a plurality of windows in a house if desired. Since this circuit includes many parts common to the circuit illustrated in Figure 1, these parts will not be enumerated in detail but corresponding reference numerals will be applied in Figure 4 where applicable.

In this figure five electric motors are shown at 110a, 110b, 110c, 110d, and 110e, each of which is grounded as indicated at 12, and each of which is adapted to be controlled by a manually operable switch including stationary contacts 14 and 16 and a movable contact 18 selectively engageable with either contact 14 or 16 to cause rotation of the motors in desired direction. The contact 18 is connected to a suitable source of power herein indicated as the storage battery 20. It will be appreciated that movable contacts 18 are parts of manually operable switches and operation of these contacts renders operation of the individual motors under the control of the operator. In order to effect automatic energization of the motors 110a to 110e the relay 40 is provided having normally open contacts 38a-38e which when energized supply current to all of the motors 110a to 110e simultaneously. The relay 40 as in the embodiment of the invention illustrated in Figure 1, is under the control of the sensitive relay 32 which is adapted to be energized as previously described when moisture falls on the grounded rain cell 26. In the present case energization of the relay 40 by-passes the manually operable switches including contacts 16 and 18, and where the circuit is connected to the convertible top and windows of a motor vehicle, the parts will be connected such that energization of the motors by the relay 40 will initiate operation of the several motors to close the top and windows.

The relay 44 includes the winding 48 connected to ground as indicated at 54 but in the present instance a plurality of limit switches 52a, 52b, 52c, 52d, and 52e are provided in parallel, each of the limit switches being associated with the vehicle top or window controlled by the corresponding motor 110a, 110b, 110c, 110d, and 110e. Thus, as each closure member (top or window) reaches closed position one of the limit switches 52a to 52e will open, but the circuit through the winding 48 will be completed through the remaining limit switches which have not as yet opened. Eventually, when all of the closure members reach closed position all of the limit switches are open and the circuit through the winding 48 is broken, thus deenergizing relay 48 which in turn deenergizes relays 32 and 40.

The overload switch or circuit breaker 22 is provided as in the previous embodiment of the invention. In this case the overload switch or circuit breaker 22 is selected so as to carry the overload circuit resulting from stalling of one or more of the motors 110a to 110e for a period sufficient to permit closure of the closure members actuated thereby. Thus for example, if one window sticks and stalls its driving motor when the circuit is first closed, the circuit breaker 22 will remain closed for an interval sufficient for the remaining closure members to move to closed position before opening in response to overload current. As before, opening of the overload switch or circuit breaker 22 will de-energize relay 44, thus finally de-energizing the entire automatic control circuit. However, when the overload switch or circuit breaker 22 recloses, each of the motors 110a to 110e may be selectively operated manually.

Preferably, the circuit breaker 22 is of the well known type including a thermostatic element 22a adapted to be heated by the current passing through the switch and to open when this element reaches a predetermined temperature. The element 22a may for example be a bi-metallic strip which is conductive or it may be a bimetallic strip associated with a separate heating element (not shown). The characteristics of the circuit breaker 22 in the circuit illustrated in Figure 4 are preferably selected such as to take into account the normal operating time for closing the windows and top. Thus for example, the windows of the vehicle may have a normal operating time in moving from open to closed position of about three seconds. On the other hand, the top may require a much longer interval as for example fifteen seconds, to move the top from open to closed position. Also, the motor operating the top is normally a larger motor than the individual window operating motors and will accordingly draw a larger current when stalled. In selecting the circuit breaker the time delay-current characteristics should be such as to open the circuit breaker when the top operating motor and one or more of the window operating motors is stalled only after an interval sufficient to permit normal closing of a window, or in the present case for example, four or five seconds. On the other hand, the characteristics should be such that with all of the window operating motors stalled, the circuit breaker will remain open for an interval sufficient to permit normal closing of the top, as for example an interval somewhat in excess of fifteen seconds. Thus, if the top is already closed and only one window of the vehicle is open, moisture falling on the rain cell will energize all motors and the stalling current of all motors except the single motor connected to the open window will pass through the circuit breaker. However, this current will not open the circuit breaker until after the single window has had time to close. On the other hand, if all of the windows are in closed position with the top down, moisture falling on the rain cell 26 will energize all of the motors and stalling current of the window operating motors will pass through the circuit breaker. This relatively smaller current however will not open the circuit breaker until after an interval more than sufficient to permit normal closing of the top.

The drawings and the foregoing specification constitute a description of the improved rain cell in such full, clear, concise and exact terms as to enable any person skilled in the art to practice the invention, the scope of which is indicated by the appended claims.

What I claim as my invention is:

1. A closure member movable between open and closed positions, power means for opening and closing said member including an electric motor, a circuit for energizing said motor including a power source, manual opening and closing switches in said circuit for selectively connecting said power source and motor to energize said motor in closure opening and closing directions, a rain cell adapted to be conductive only when wet connected between said power source and ground, a first relay having a coil and normally open contacts connected in parallel with said closure closing switch, a second relay having a coil and normally open contacts adapted when closed to energize the coil of said first relay, circuit means connecting said rain cell in series with the coil of said second relay, circuit means connecting the other side of said coil to the power source including a holding circuit energized by momentary contact, and a limit switch operable by movement of said closure to closed position to de-energize said holding circuit.

2. A system as defined in claim 1 comprising a normally closed switch adapted to open in response to overload connected to interrupt current flow from said power source to said motor and to said relays upon overload condition in said motor.

3. A system as defined in claim 1 in which said circuit for energizing said second winding comprises a normally open manual reset switch located for convenient actuation in the place to be closed.

4. A system as defined in claim 1 in which said power source comprises a battery, a generator for charging said battery, the circuit for energizing said holding circuit comprising a relay having normally open contacts and a winding effective to hold its contacts closed at less than battery voltage connected between said generator and ground.

5. A system as defined in claim 1 comprising a manual lock-out switch in series with said holding circuit and located in a relatively inaccessible position to prevent accidental closure.

6. A system as defined in claim 1 applied to a motor vehicle, said vehicle including the usual key controlled ignition system, a holding circuit including a third relay having normally closed contacts in series with said second relay and a grounded winding in parallel with said ignition system.

7. For use in a convertible motor vehicle having a convertible top and a plurality of movable windows, and power means for opening and closing said top and said windows including separate electric motors and the usual vehicle battery as the source of power, a control circuit for automatically operating said motor in a direction to close said top and windows in the event of rain, said circuit comprising a control relay effective when energized to close the power circuits to said motor, a weather-responsive circuit including a sensitive relay and a rain cell effective when wet to conduct current in series with said sensitive relay, said sensitive relay when energized being effective to energize said control circuit, and a third relay effective when energized to complete a circuit to the winding of said sensitive relay, a holding circuit comprising a connection from said weather-responsive circuit to the winding of said third relay, a group of limit switches connected in parallel, each of said limit switches being normally closed and opened in response to closure of one of said top and windows, said group of limit switches being in series with the winding of said third relay, and an overload circuit breaker in series with the power circuits to all of said motors and in series with the winding of said third relay effective to de-energize said third relay when opened, said circuit breaker having a time delay sufficient to carry overload currents resulting from stalling of said motors for a time sufficient to permit closure of said top and windows.

8. Structure as defined in claim 7 in which said overload circuit breaker is of the thermal type and has time delay characteristics such as to open with the top operating motor stalled only after an interval sufficient to permit normal closing of said windows, and with all of said window operating motors stalled only after an interval sufficient to permit normal closing of said top.

References Cited in the file of this patent

UNITED STATES PATENTS

| | | |
|---|---|---|
| 2,198,488 | Smith | Apr. 23, 1940 |
| 2,424,735 | Boothroyd | July 29, 1947 |
| 2,617,972 | Nutter | Nov. 11, 1952 |
| 2,640,958 | Davis | June 2, 1953 |